Figure 1:
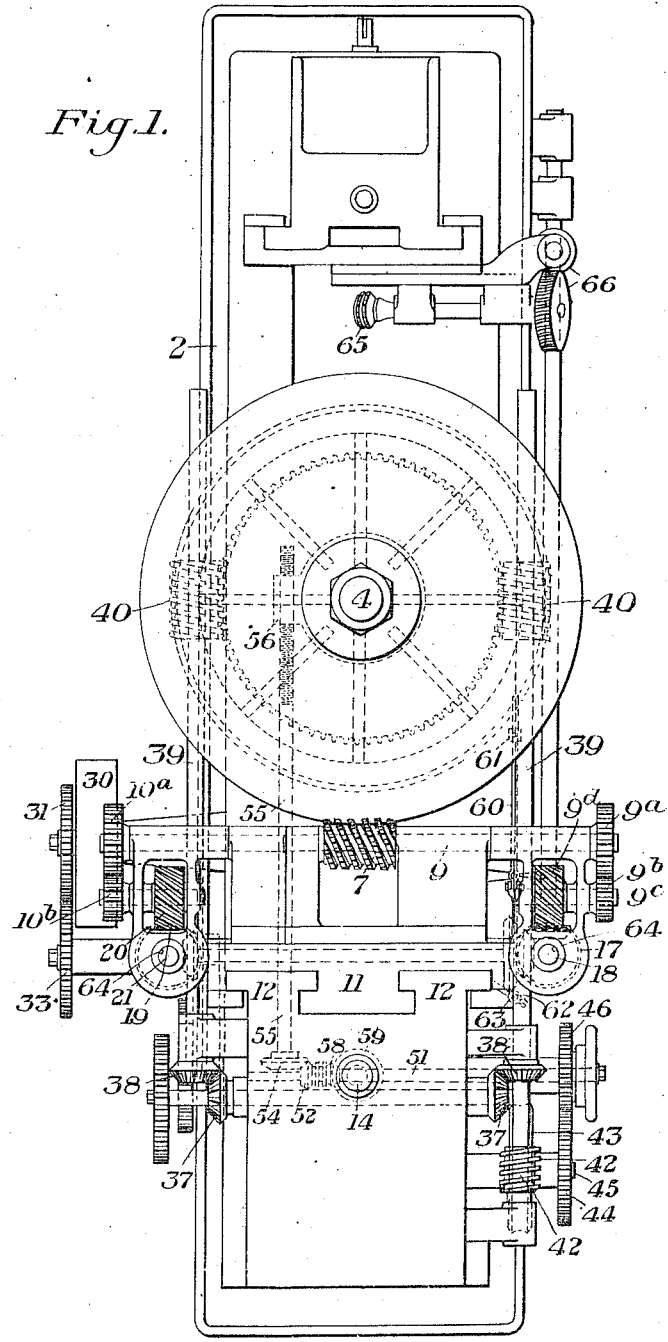

T. FAWCUS.
GEAR CUTTING MACHINE.
APPLICATION FILED JAN. 11, 1912.

1,049,350.

Patented Jan. 7, 1913.

2 SHEETS—SHEET 1.

WITNESSES

INVENTOR

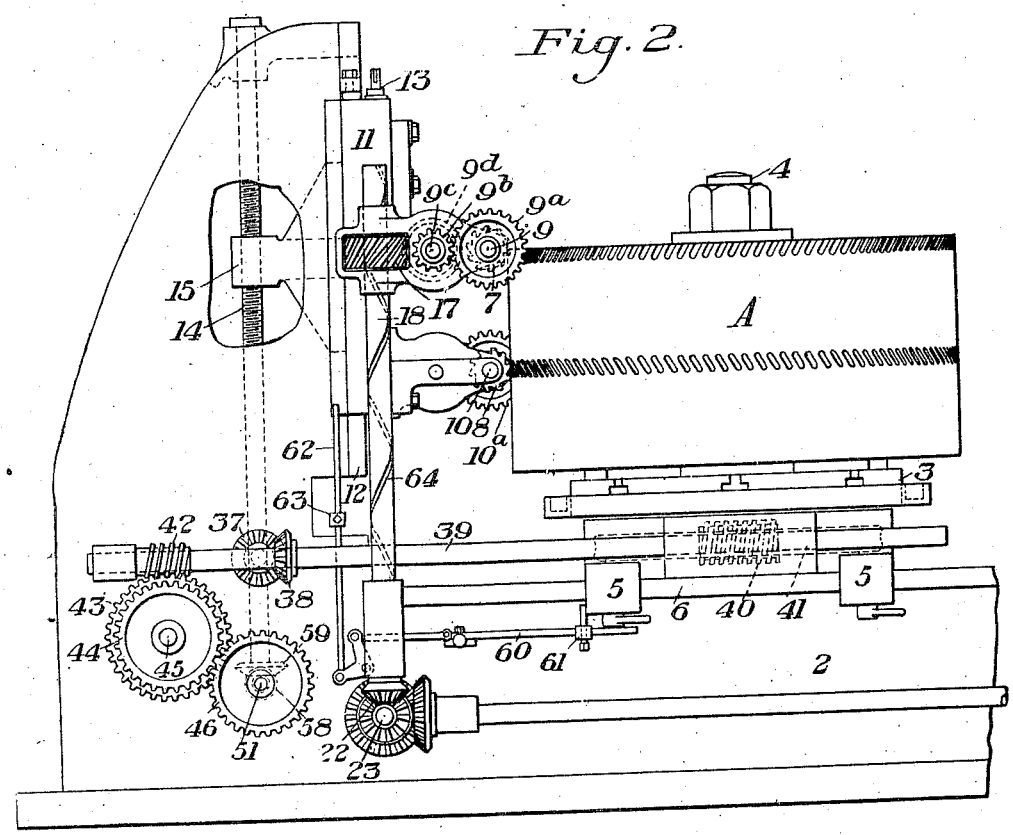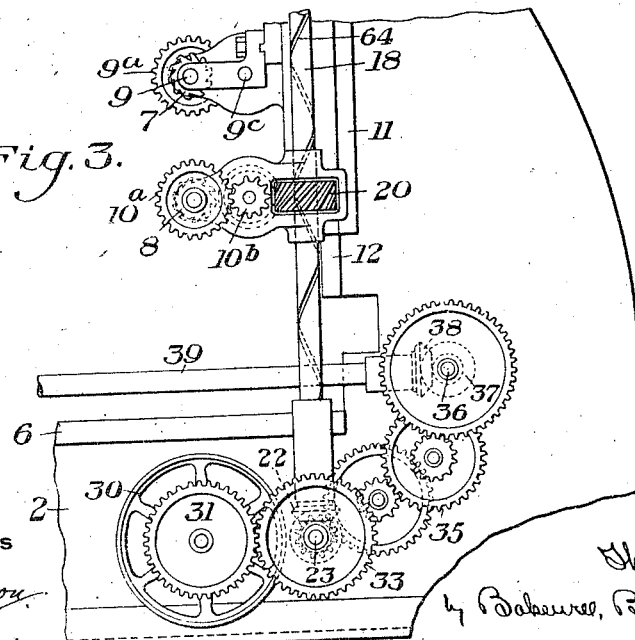

UNITED STATES PATENT OFFICE.

THOMAS FAWCUS, OF PITTSBURGH, PENNSYLVANIA.

GEAR-CUTTING MACHINE.

1,049,350.  Specification of Letters Patent.  Patented Jan. 7, 1913.

Application filed January 11, 1912. Serial No. 670,603.

*To all whom it may concern:*

Be it known that I, THOMAS FAWCUS, a resident of Pittsburgh, in the county of Allegheny and State of Pennsylvania, have invented a new and useful Improvement in Gear-Cutting Machines, of which the following is a full, clear, and exact description, reference being had to the accompanying drawings, forming part of this specification, in which—

Figure 1 is a plan view of a machine embodying my invention; Fig. 2 is a side elevation of a portion of the machine; and Fig. 3 is a side view of a portion of the machine looking from the opposite side.

The present invention is an improvement upon the gear-cutting machine described and claimed in my application, Serial No. 613,885, filed March 11, 1911, and which is particularly adapted for cutting double helical gears. The machine described and claimed in that application comprises a rotatable blank support, means for revolving the same, a pair of rotary cutting hobs mounted on separate axes and arranged to act simultaneously upon the revolving gear blank, together with means for feeding both hobs in the same direction and in a line parallel to the axis of the blank. One of the hobs is arranged to cut from one edge of the blank toward the center, while the other cuts from the central portion of the blank toward the opposite edge. Inasmuch as the two hobs are working simultaneously upon the blank, each forming one-half of a double helical tooth, it was necessary in the machine of the said application to provide means whereby the speed of one of the hobs will be retarded relatively to the speed of the rotating blank, and whereby the speed of the other hob will be advanced with reference to the speed of the rotating blank. In the machine specifically shown and described in said application, for the purpose of obtaining this variation in the speed of the hobs relatively to the speed of the blank, I provide an arrangement of differential gears.

The present invention relates to a machine which is generally similar to that of the said application, but is designed to obviate the use of the differential gears and to provide other means of simple and effective character for obtaining such speed variation, thus doing away with a considerable number of gears and greatly simplifying the machine.

In the accompanying drawings, the numeral 2 designates the bed frame of the machine which may be of any suitable character.

3 designates a rotary blank-supporting table which is mounted to rotate in a horizontal plane upon the vertical shaft 4, this shaft, in turn, being mounted in the carriage 5, movable longitudinally on the bed of the machine in suitable ways 6.

A designates a partially cut blank which is secured on the table 3 in any suitable manner and which is to have double helical teeth cut therein.

7 and 8 designate the two cutter hobs having helical cutting teeth which mesh with the teeth which they cut in the blank, one of the hobs being right-handed and the other left-handed. The hob 7 is mounted upon the transverse shaft 9, while the hob 8 is mounted on the transverse shaft 10, these two shafts being journaled one above another in suitable bearings on a vertically movable slide or carrier 11, which works on the vertical ways 12. Provision is made, as indicated at 13, whereby the bearings for the shaft 9 may be adjusted to vary the distance between the centers of the two shafts 9 and 10, to suit different sized gear blanks. The slide or carrier 11 is given its feed movement by the vertical feed screw 14, which engages a nut portion 15, of the slide or carriage. The hob shaft 9 has at one end a gear wheel $9^a$, which is engaged and driven by a pinion $9^b$, on an intermediate shaft $9^c$, which has a spiral gear $9^d$, engaged and driven by a spiral gear 17, on a vertical shaft 18 at one side of the machine. The hob shaft 10 is driven through similar gears $10^a$ and $10^b$ and spiral gears 19 and 20, the latter being on a vertical shaft 21, at the opposite side of the machine. Each of the shafts 18 and 21 carries a bevel gear wheel 22 at the lower end for engagement with a corresponding bevel gear on a transverse driving shaft 23. The worm shaft 23 drives the two shafts 18 and 21 in opposite direction, so that the two hobs are driven in opposite directions.

The numeral 30 designates a belt pulley which forms the main drive of the machine. The shaft of this pulley carries the gear wheel 31, which, through the gears 33, drives the shaft 23, before described, and through the train of gears 35, drives the shaft 36. The shaft 36 carries two bevel gear wheels 37, each of which meshes with a bevel gear wheel 38, on the longitudinal shafts 39. The shafts 39 are arranged at opposite sides of the machine and each of them carries a worm 40, which meshes with a worm wheel 41, on the table 3, these worm wheels providing means for the rotation of the table and the gear blank. The shaft 39 at one side of the machine also carries a worm 42, which meshes with a worm wheel 43, having attached thereto a gear wheel 44, carried by a stub shaft 45, and meshing with the gear wheel 46. This gear 46 is mounted on the transverse shaft 51, carrying a bevel gear pinion 52, which meshes with a bevel pinion 54 on the longitudinal shaft 55. The shaft 55 has a threaded portion which is adapted to engage and actuate a nut 56 on the carriage 5. The shaft 51 also has a bevel pinion 58, meshing with a bevel pinion 59 on the feed shaft or screw 14, before referred to. Said shaft 51, therefore, through the shaft 55, forms a means for feeding the blank longitudinally of the machine and also acts as a driving shaft for moving the cutter or hob carrier. The two pinions 52 and 58 are loosely mounted on the shaft 51, and are arranged to be alternately connected therewith through suitable clutch mechanism not shown, but which is arranged to be controlled through the operation of a shifting rod 60, having a collar 61, which is arranged to be engaged by the carriage 5. This shifting rod also has a connected member 62, provided with an adjustable collar 63, which is arranged to be engaged by the slide or carrier 11.

As thus far described, the machine is generally similar to that of the prior application above referred to, with the exception that the vertical shafts 18 and 21 are not formed in sections with a differential gear connection, as in the said application. In the present machine, each of said shafts is formed with a helical groove or keyway 64, which is engaged by a key or feather in the hub of the corresponding spiral gear 17 or 20. It will be apparent that as the screw shaft 14 is actuated to feed the cutter carrier downwardly in a direction parallel to the axis of the blank A, the keys of the gears 17 and 20 will be obliged to follow these helical grooves or keyways, and that, inasmuch as said shafts 18 and 21 are rotating in opposite directions, one of the worms will be caused by this groove or keyway to have its effective speed slightly increased relatively to the speed of the rotating blank; while the other worm will have its effective speed correspondingly retarded. This change in the speeds of these two worms effects, of course, a corresponding change in the relative speeds of the two hobs or cutters relatively to the blanks, and the result is to cause the cutters to form teeth at the proper angle and pitch. Inasmuch as the angle and pitch of the teeth also vary for different gears, provision is preferably made for driving the shafts 18 and 21 at different speeds by the use of suitable change gears and driving connections.

The operation of the machine is as follows: The blank having been secured in place on the table 3 and the hobs 7 and 8 adjusted at a distance apart suitable to the width of face of the gear to be cut, the machine is set in motion and the hobs and blank caused to revolve at their relative speeds, that is, at the precise ratio which the number of threads in each hob bears to the number of teeth to be cut in the blank. The shaft 56 is now put into operation to feed the blank forwardly into cutting relation to the hobs, and this feed movement is allowed to proceed until the required depth of cut is reached. The upper hob 7 is set to cut slightly below the center line on the edge of the blank, and the hob 8 to cut approximately at the peripheral center of the blank. When the blank has been fed and the cutting operation has progressed until the required depth of cut is reached, the vertical feed is set in operation through the gear 59 and the screw 14.

It will be readily understood that by the use of change gears at a suitable point in the train of gearing described, both the rate of feed of the feed screw 14 and also the time relation between the feed screw and the speed of the spiral gears $1^7$ and 19 may be varied.

There is a definite relation between the pitch of the helix on the vertical shafts and the pitch of the hob, so that if the hob shafts were geared positively to the vertical shafts, it would be necessary to have a different set of vertical shafts for every pitch. This is obviated by making the gears $9^a$ and $9^b$ change gears, whereby the relation between the speeds of the vertical shafts and the hobs may be varied, as the pitches vary. For example, assuming that for a given pitch and angle, even gears were necessary at $9^a$ and $9^b$, for twice the pitch and the same angle, the hobs would be twice the diameter of the former ones and gears to secure a reduction of two to one, would be used at $9^a$ and $9^b$. In other words, the number of revolutions would be reduced one-half, but since the hob is twice as large, the periphery speed remains the same.

Instead of driving the two shafts 18 and 21 in opposite directions, they may, of course, be driven in the same direction and have their helixes of opposite hand.

The numeral 65 designates a cutter which is arranged to make a cut in a line substantially parallel to the axis of the blank and which is driven through the gears 66. The purpose of this cutter is the same as the corresponding cutter described in my said application, namely, to remove the apices of the connecting portions of the two sets of teeth in making gears of the character described and claimed in my said Patent, No. 978,980, dated October 4, 1910.

The advantages of my invention result from its simplicity; the elimination of the differential gear trains and all the change gears connected therewith; and a positive method of speed differentiation which can not operate without the feed and can not fail to operate with it, being substituted. There is such a small amount of movement that there is practically no loss of motion through wear. Consequently, there is little opportunity for errors and the work can be accurately done.

I do not wish to limit myself to the details of the machine as herein shown and described, since it is obvious that various changes within the scope of the claims may be made therein within the spirit and scope of my invention; and that, so long as the machine embodies the essential features of the invention set forth in the appended claims, this embodiment may differ widely from the particular embodiment which I have shown and described.

I claim:

1. In a machine for forming double helical gears, two rotary cutters, means for feeding said cutters in the same direction, and means for driving the cutters at relatively different speeds, said means comprising gear members and shafts for said members, said shafts having helical grooves or ways to be traversed by the gear members, substantially as described.

2. In a machine for forming helical gears, two rotary cutters, means for feeding said cutters in the same direction, and means for rotating the cutters at relatively different speeds, said means comprising gear members and oppositely driven driving shafts for said members upon which they are longitudinally movable, said shafts having helical grooves or ways, and the feeding means being adapted to move said members on said shafts, substantially as described.

3. In a machine for cutting helical gears, a rotary cutter, and driving means therefor, said means comprising a shaft having a helical groove or way, and a gear member longitudinally movable on said shaft and having a key engaging said groove or way, substantially as described.

4. In a machine for cutting helical gears, a rotary cutter, and driving means therefor comprising a shaft, a gear wheel movable longitudinally of the shaft, and feeding mechanism connected to the gear wheel to move it on its shaft, with means for varying the speed of the gear relative to the shaft as it is moved thereon, substantially as described.

5. In a machine for cutting helical gears, a rotary hob, driving means therefor comprising a shaft, a gear wheel movable longitudinally of the shaft, and feeding mechanism connected to the gear wheel to move it on its shaft, with means for varying the speed of the gear relative to the shaft as it is moved thereon, and means for varying the speed of rotation of the hob for hobs of different diameters, substantially as described.

6. In a machine for cutting helical gears, a rotary hob, driving means therefor comprising a shaft, a gear wheel movable longitudinally of the shaft, and feeding mechanism connected to the gear wheel to move it on its shaft, with means for varying the speed of the gear relative to the shaft as it is moved thereon, and a gear connection between the said gear wheel and the hob having a changeable element, substantially as described.

In testimony whereof, I have hereunto set my hand.

THOMAS FAWCUS.

Witnesses:
 H. M. CORWIN,
 GEO. H. PARMELEE.